US008589576B2

(12) United States Patent
Tanaka et al.

(10) Patent No.: US 8,589,576 B2
(45) Date of Patent: Nov. 19, 2013

(54) CONTENTS DISTRIBUTING SYSTEM, CLIENT, SERVER, CONTENTS DISTRIBUTING METHOD, AND CONTENTS REPRODUCING METHOD

(75) Inventors: Katsuaki Tanaka, Hamamatsu (JP); Tetsuya Matsuyama, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 454 days.

(21) Appl. No.: 11/632,114

(22) PCT Filed: Jul. 14, 2005

(86) PCT No.: PCT/JP2005/013088
§ 371 (c)(1),
(2), (4) Date: Oct. 9, 2007

(87) PCT Pub. No.: WO2006/006685
PCT Pub. Date: Jan. 19, 2006

(65) Prior Publication Data
US 2008/0195695 A1  Aug. 14, 2008

(30) Foreign Application Priority Data
Jul. 15, 2004  (JP) .................. 2004-209105

(51) Int. Cl.
G06F 15/16 (2006.01)
G06F 21/00 (2013.01)
H04H 20/71 (2008.01)
H04H 60/09 (2008.01)

(52) U.S. Cl.
USPC ............ 709/231; 705/51; 455/3.01; 455/3.04

(58) Field of Classification Search
USPC .................................. 709/230–238
See application file for complete search history.

(56) References Cited

U.S. PATENT DOCUMENTS

| 5,881,245 A | 3/1999 | Thompson |
| 5,919,047 A | 7/1999 | Sone |
| 6,248,944 B1 | 6/2001 | Ito |
| 2002/0013943 A1 | 1/2002 | Haberman et al. |

(Continued)

FOREIGN PATENT DOCUMENTS

| EP | 0791914 A1 | 8/1997 |
| JP | 9-230880 A | 9/1997 |

(Continued)

OTHER PUBLICATIONS

Hui Lei et al; The Design and Applications of a Context Service; 2002;ACM;6;45-55.*

(Continued)

Primary Examiner — Evans Desrosiers
(74) Attorney, Agent, or Firm — Crowell & Moring LLP

(57) ABSTRACT

A contents distributing system capable of reproducing a plurality of contents continuously at the client not to put a waiting time can be provided. A server 100 reads respective contents constituting a group from a memory device 102 and then transmits continuously the contents when such server receives a request for distribution of plural pieces of contents formed into a group. A client 200 stores sequentially the received contents in a buffer 205. An AV outputting portion 206 of the client reads the contents stored in this buffer sequentially from the early stored contents and then reproduces the contents.

23 Claims, 5 Drawing Sheets

(56) References Cited

U.S. PATENT DOCUMENTS

| | | |
|---|---|---|
| 2002/0095683 A1 | 7/2002 | Watanabe |
| 2002/0194351 A1* | 12/2002 | Nishimura et al. ............ 709/229 |
| 2003/0028539 A1 | 2/2003 | Nunome et al. |
| 2004/0015713 A1* | 1/2004 | Abe et al. ...................... 713/200 |
| 2004/0121724 A1* | 6/2004 | Yahagi ........................ 455/3.01 |
| 2004/0128286 A1* | 7/2004 | Yasushi et al. .................... 707/3 |
| 2004/0215568 A1* | 10/2004 | Fukushima et al. ............ 705/51 |
| 2006/0133777 A1 | 6/2006 | Yamamoto et al. |

FOREIGN PATENT DOCUMENTS

| | | |
|---|---|---|
| JP | 11-296984 A | 10/1999 |
| JP | 2001-257715 A | 9/2001 |
| JP | 2001-258067 A | 9/2001 |
| JP | 2002-91863 A | 3/2002 |
| JP | 2002-125002 A | 4/2002 |
| JP | 2002-156982 A | 5/2002 |
| JP | 2002183014 A * | 6/2002 |
| JP | 2002-215516 A | 8/2002 |
| JP | 2003-50588 A | 2/2003 |
| JP | 2003-84761 A | 3/2003 |
| JP | 2003-263175 A | 9/2003 |
| JP | 2003289507 A | 10/2003 |
| JP | 2004-191515 A | 7/2004 |
| WO | WO 00/20974 A1 | 4/2000 |

OTHER PUBLICATIONS

Yamaha, "Yamaha presents MusicCAST, the world's first Interactive Wireless home music network system for family enjoyment", Music-CAST Catalogue Aug. 2003, Yamaha Electronics Corporation, USA.
International Search Report dated Sep. 6, 2005 with English translation of relevant portion (Four (4) pages).
Japanese Office Action dated Mar. 16, 2010 including partial English translation (Seven (7) pages).
European Search Report dated Jul. 24, 2012 (five (5) pages).
Japanese Office Action dated Mar. 8, 2012 including English-language translation (8 pages).

* cited by examiner

CONTENTS DISTRIBUTING SYSTEM, CLIENT, SERVER, CONTENTS DISTRIBUTING METHOD, AND CONTENTS REPRODUCING METHOD

TECHNICAL FIELD

The present invention relates to a contents distributing system, a client, a server, a contents distributing method, and a contents reproducing method for distributing contents such as a music, a video, and the like from a server to a client.

BACKGROUND ART

Various contents distributing systems in which the server distributes contents such as a music, a video, and the like via a network such as a wire LAN, a wireless LAN, or the like in answer to the request issued from the client have been provided. As an example of this kind of contents distributing system, the system set forth in Non-Patent Literature 1, for example, can be cited. According to this contents distributing system, the user can send the request to the server via the client while sitting in user's own room and enjoy the music offered from the server in answer to this request.

Non-Patent Literature 1: YAMAHA MusicCast (registered trademark) Catalogue 2003 August

DISCLOSURE OF THE INVENTION

Meanwhile, in the foregoing contents distributing system in the prior art, the client can receive the distribution of music contents either piece by piece or in unit of plural pieces, e.g., in unit of all pieces of music recorded on one CD. However, in the latter case, respective pieces of music in the CD are also stored in the server as individual contents. Therefore, in the contents distributing system in the prior art, when the server carries out the contents distribution of all pieces of music contained in one CD, for example, the server side executes the subsequent distribution of contents to wait until the preceding reproduction of the contents on the client side has been completed in such a way that the server distributes the first piece to the client and the client completes the reproduction of the first piece and then the server distributes the second piece at a time point when the client informs the server of that effect, and so on. In this case, a waiting time is needed to some extent until the subsequent reproduction of the contents is started on the client side after the notice of reproduction completion is sent from the client to the server and then the subsequent contents is distributed from the server to the client. For this reason, respective pieces of music are reproduced on the client side to put this waiting time. When respective pieces of music to be reproduced are individual pieces of music, such waiting time is not much of a problem to the user. However, the user of the contents distributing system often receives the distribution of all pieces of the live album that have been recorded live, for example. In this kind of album, because a sound is generated in a waiting time between the pieces of music, such sound in the waiting time is also reproduced when the CD is played. However, when the client receives the distribution of all pieces of such live album by utilizing the contents distributing system, the music reproduced on the client side has a relatively long silent period between the pieces of music and thus the reproduced music sounds unnatural rather than the reproduced music of CD.

The present invention has been made in view of the above circumstances, and it is an object of the present invention to provide a contents distributing system, a client, a server, a contents distributing method, and a contents reproducing method, capable of reproducing a plurality of contents continuously at the client not to put a waiting time.

In order to solve the above problems, the present invention provides a contents distributing system, a client, a server, a contents distributing method, and a contents reproducing method described in the following.

(1) A contents distributing system, comprising:
   a server; and
   a client connected to the server via a network;
   wherein the server includes:
      a storing portion that is adapted to store plural pieces of contents; and
      a transmitting portion that reads the plural pieces of contents constituting a group from the storing portion and then transmits the plural pieces of contents continuously to the client, when the transmitting portion receives a request for distribution of the plural pieces of contents formed in a group from the client; and
   wherein the client includes:
      a receiving portion that receives the plural pieces of contents from the server;
      a buffer that is configured to stores the plural pieces of contents received by the receiving portion sequentially; and
      a reproducing portion that reads the plural pieces of contents stored in the buffer sequentially from the early stored contents, and then reproduces the plural pieces of contents.

Here, the wording "to transmit plural pieces of contents continuously to the client" signifies that "the server transmits plural pieces of contents to the client not to wait the notice of reproduction completion from the client".

(2) In the contents distributing system according to (1), the transmitting portion transmits the plural pieces of contents and contents-attached information that the client uses in a reproducing process of the contents. The reproducing portion reproduces the contents by using the contents-attached information corresponding to the contents read from the buffer.

(3) In the contents distributing system according to (1), the reproducing portion reproduces the plural pieces of contents transmitted continuously from the server in a crossfade mode.

(4) A client adapted to be connected to a server via a network, comprising:
   a transmitting portion that transmits a request signal for requesting a distribution of a plural pieces of contents formed into a group to a server;
   a receiving portion that receives the plural pieces of contents transmitted continuously from the server;
   a buffer that is adapted to store sequentially the plural pieces of contents received by the receiving portion; and
   a reproducing portion that reads the plural pieces of contents stored in the buffer sequentially from the early stored contents and then reproduces the plural pieces of contents.

Here, the wording "plural pieces of contents transmitted continuously" signifies that "plural pieces of contents that the server transmits to the client not to wait the notice of reproduction completion from the client".

(5). In the client according to (4), the receiving portion receives the contents and contents-attached information that the client uses in a reproducing process of the contents. The reproducing portion reproduces the contents by using the contents-attached information corresponding to the contents read from the buffer.

(6) In the client according to (4), the reproducing portion reproduces the plural pieces of contents transmitted continuously from the server in a crossfade mode.

(7) A server adapted to be connected to a client via a network, comprising:
   a storing portion that adapted to store plural pieces of contents;
   a receiving portion that receives a request signal for requesting a distribution of plural pieces of contents formed into a group from the client; and
   a transmitting portion that reads the plural pieces of contents constituting a group from the storing portion based on the request signal, and transmits continuously the plural pieces of contents to the client.

Here, the wording "to transmit plural pieces of contents continuously to the client" signifies that "the server transmits plural pieces of contents to the client not to wait the notice of reproduction completion from the client".

(8) In the server according to (7), the transmitting portion transmits the contents and contents-attached information that the client uses in a reproducing process of the contents.

(9) A method of distributing a contents from a server to a client via a network, comprising:
   transmitting a request signal for requesting a distribution of plural pieces of contents formed into a group from the client to the server;
   reading the plural pieces of contents constituting a group from the storing portion of the server based on the request signal;
   transmitting continuously the plural pieces of read contents to the client;
   receiving the plural pieces of read contents transmitted from the server;
   storing the plural pieces of received contents sequentially in the buffer; and
   reading the plural pieces of contents stored in the buffer sequentially from the early stored contents and then reproducing the plural pieces of contents.

Here, the wording "to transmit plural pieces of contents continuously to the client" signifies that "the server transmits plural pieces of contents to the client not to wait the notice of reproduction completion from the client".

(10) In the method according to (9), in the process of transmitting the plural pieces of contents, the contents and contents-attached information that the client uses in a reproducing process of the contents are transmitted. In the reproducing process, the contents is reproduced by using the contents-attached information corresponding to the contents read from the buffer.

(11) In the method according to (9), in the reproducing process, the plural pieces of contents transmitted continuously from the server are reproduced in a crossfade mode.

(12) A method of reproducing a contents at a client adapted to be connected to a server via a network, comprising:
   transmitting a signal for requesting a distribution of plural pieces of contents formed into a group to the server;
   receiving the plural pieces of contents transmitted continuously from the server;
   storing the plural pieces of received contents sequentially in the buffer; and
   reading the plural pieces of contents stored in the buffer sequentially from the early stored contents and then reproducing the plural pieces of contents.

Here, the wording "plural pieces of contents transmitted continuously" signifies that "plural pieces of contents that the server transmits to the client not to wait the notice of reproduction completion from the client".

(13) In the contents reproducing method according to (12), in the receiving process, the contents and contents-attached information that the client uses in a reproducing process of the contents are receives. In the reproducing process, the contents is reproduced by using the contents-attached information corresponding to the contents read from the buffer.

(14) In the contents reproducing method according to (12), in the reproducing process, the plural pieces of contents transmitted continuously from the server are reproduced in a crossfade mode.

According to the present invention, when the request for distribution of a plurality of contents formed in a group is sent, these contents are sent out continuously from the server to the client. Therefore, these contents can be reproduced continuously on the client side.

Figure 1:
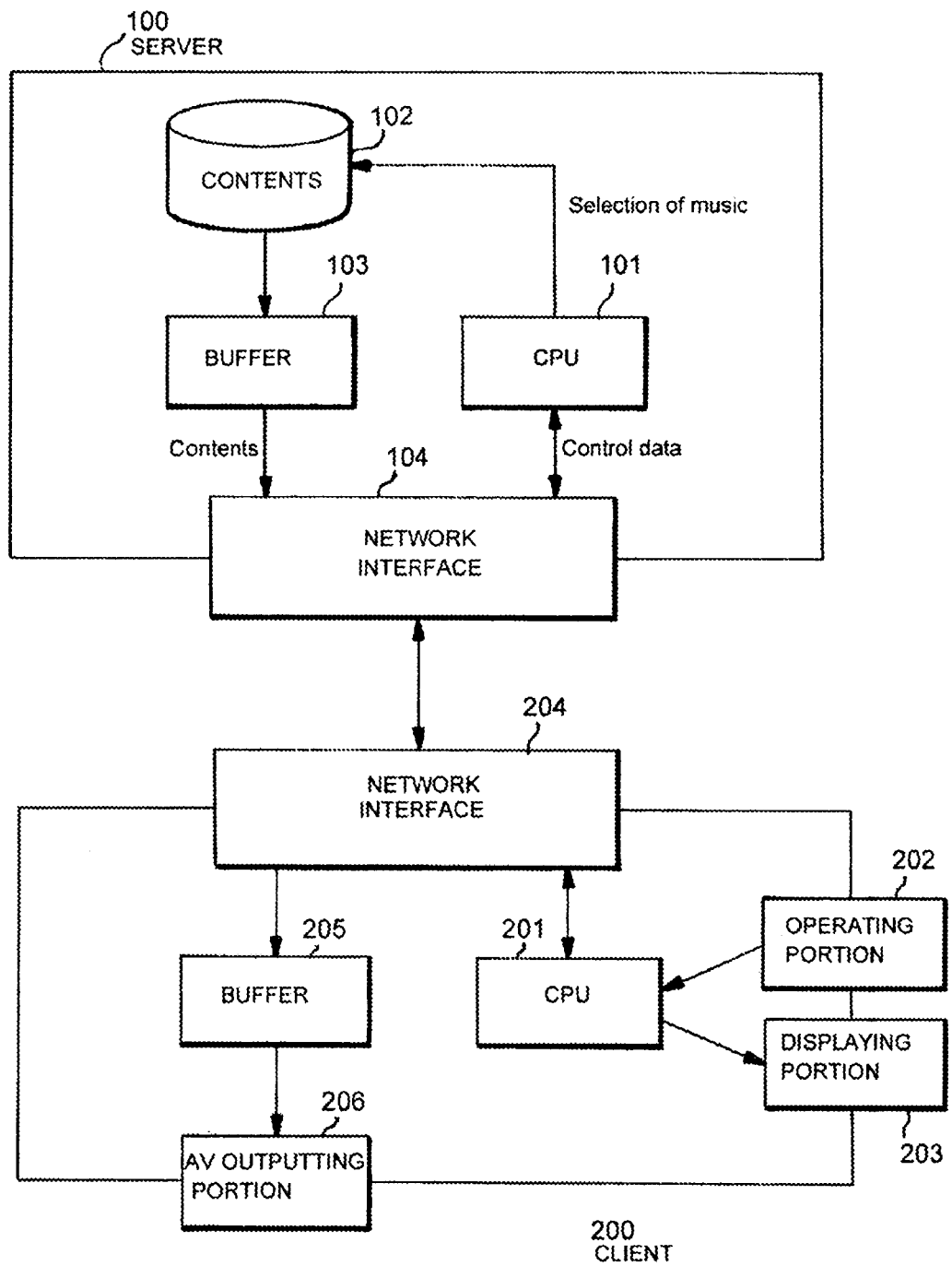
[FIG. 1] A block diagram showing a configuration of a contents distributing system according to a first embodiment of the present invention.

REFERENCE NUMBERS DESCRIBED IN THE SPECIFICATION ARE AS FOLLOWS 100 server
101 CPU
102 memory device
103 buffer
104 network interface
200 client
201 CPU
202 operating portion
204 network interface
205 buffer
206 AV outputting portion

BEST MODE FOR CARRYING OUT THE INVENTION

Embodiments of the present invention will be explained with reference to the drawings hereinafter.

<First Embodiment>

FIG. 1 is a block diagram showing a configuration of a contents distributing system according to a first embodiment of the present invention. In FIG. 1, a server 100 is connected to at least one client 200 via a network such as a LAN, or the like. The server 100 is an equipment that executes the distribution of contents in answer to the request from the client 200. In the present embodiment, the contents of multimedia information consisting of stream data on a video track and stream data on a sound track are sent out from the server 100 to the client 200. The server 100 contains a CPU 101 for applying distribution control of the contents to respective clients 200 as the object, a memory device 102 for storing various contents, a buffer 103 for storing temporarily the contents addressed to the client 200, and a network interface 104 for executing communication control between the server 100 and the client 200.

The client 200 is an equipment that sends the request for distribution of the contents to the server 100 in accordance with the user's operation and then reproduces the contents distributed from the server 100 in answer to this request. This client 200 contains a CPU 201 which executes control to receive the contents instructed by the user from the server 100 and control to reproduce the received contents, an operating portion 202 having operating devices such as a key pad, and the like and for sending these operation information to the CPU 201, a displaying portion 203 for displaying various information in compliance with the instruction from the CPU 201, a network interface 204 for executing communication control between the client 200 and the server 100, a buffer 205 for storing temporarily the contents received from the server 100 via the network interface 204, and an AV outputting portion 206 for reading the contents in the buffer 205 to reproduce the music and the video.

In the present embodiment, as the method of designating the contents as the object of distribution, there are the individual designating method of designating the contents one by one and the grouping designating method of designating a group consisting of plural contents. The user can operate the operating portion 202 of the client 200 to instruct the server 100 what contents is to be distributed, in accordance with a desired method out of two types of designating methods. Also, in the present embodiment, as the operation mode in distributing the contents, there are two types of the individual transmitting mode and the continuous transmitting mode. The individual transmitting mode is the operation mode selected when the contents is designated by the individual designating method. In this operation mode, the server 100 distributes the contents one by one in answer to the request for distribution from the client 200. In contrast, the continuous transmitting mode is the operation mode selected when the contents is designated by the grouping designating method. In this operation mode, the server 100 transmits continuously plural pieces of contents belonging to the group that is designated by the client 200. Here, the wording "the server 100 transmits continuously plural pieces of contents" signifies that "the server 100 transmits plural pieces of contents to the client 200 not to wait a notice of reproduction completion from the client 200". As a typical example in which the contents is designated by the grouping designating method, the case where the live album that has been recorded live is designated may be cited. In this case, respective pieces of music constituting the album are stored in the memory device 102 as individual contents. However, when the request for distribution to designate this album is sent from the client 200 to the server 100, the contents of respective pieces of music constituting this album are transmitted continuously to the client 200.

Figure 2:
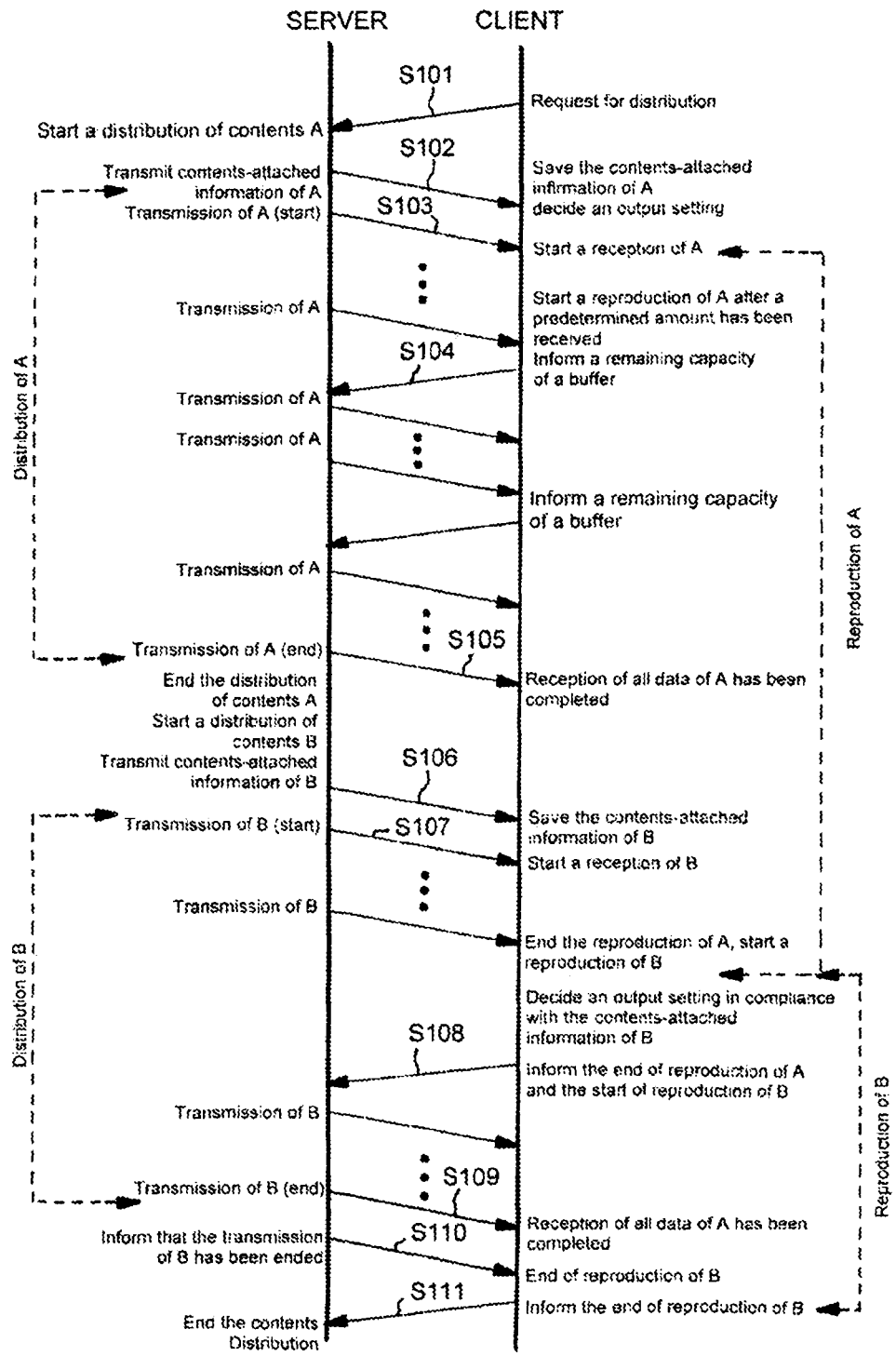
[FIG. 2] A sequence diagram showing an operation in the first embodiment.

FIG. 2 is a sequence diagram showing a first example of the operation of the present embodiment when the continuous transmitting mode is selected. When the request for distribution of the group consisting of plural pieces of contents is sent out from the client 200 to the server 100 (step S101), the CPU 101 of the server 100 starts the operation to distribute the contents of the group in the continuous transmitting mode.

First, the CPU 101 of the server 100 reads contents-attached information of the first contents A in the group designated by the request for distribution from the memory device 102 and transmits this information to the client 200 (step S102). The contents-attached information contains information regarding the pre-emphasis that is applied to stream data on the sound track in the contents A, and information such as a title displayed on the displaying portion 203 in reproducing the video of the contents A on the client 200 side, and the like. When the CPU 201 of the client 200 received this contents-attached information, the CPU instructs the AV outputting portion 206 to set a level of de-emphasis in the music reproduction based on the information about the pre-emphasis contained in this contents-attached information, and also instructs the AV outputting portion 206 to display the title contained in this contents-attached information.

Then, the CPU 101 of the server 100, after finished the transmission of the contents-attached information, starts transmission of the contents A subsequently (step S103). The CPU 201 of the client 200 accumulates data of the contents A sent from the server 100 in the buffer 205. Then, the CPU 201 instructs the AV outputting portion 206 to reproduce the data of the contents A accumulated in the buffer 205 at a time point when a predetermined amount of data are accumulated. Accordingly, the AV outputting portion 206 reads the data of the contents A accumulated in the buffer 205 sequentially in order of accumulation, and reproduces the data as the sound and the video. Then, the CPU 201 monitors a remaining capacity of the buffer 205, i.e., an amount of data not reproduced yet, and informs periodically the server 100 of this remaining capacity (step S104). The CPU 101 of the server 100 controls a transmission rate of the contents A supplied to the client 200, based on the remaining capacity of the buffer 205 informed from the client 200.

In the present embodiment, a feedback control is applied such that a transmission rate is decreased when the remaining capacity of the buffer 205 exceeds a predetermined amount and a transmission rate is increased when the remaining capacity falls below a predetermined amount. Thus, a predetermined remaining capacity can be maintained in the buffer 205 by such feedback control. As a result, even though a short transmission interruption in the data transmission between the server 100 and the client 200 is caused due to the factor such as a congestion of the network, or the like, for example, the data remaining in the buffer 205 is supplied to the AV outputting portion 206 during this interruption and thus the music and the video can be reproduced without interruption.

When the server ends the transmission of the last data of the contents A (step S105), the CPU 101 of the server 100 selects contents B subsequent to the contents A in the group designated by the client 200 and then transmits contents-attached information of the contents B to the client 200 (step S106). Then, the CPU 101 starts the transmission of the contents B to the client 200 subsequently to the transmission of this contents-attached information (step S107). In the contents distributing system in the prior art, the server starts the distribution of the subsequent contents B after it received the notice of the reproduction completion of the contents A. In contrast, in the present embodiment, in the continuous transmitting mode, the CPU 101 of the server 100 transmits the contents B subsequently to the contents A not to wait the notice of the reproduction completion from the client.

The CPU 201 of the client 200, when received the last data of the contents A, loads such data in the buffer 205. Then, the CPU 201, when received the contents-attached information of the contents B, stores this contents-attached information in a built-in register (not shown). Then, when the reception of data of the contents B is started, the CPU 201 loads this data in the buffer 205 subsequently to the last data of the contents A. At that time, the CPU 201 stores the address of the buffer 205, in which the first data of the contents B is stored, in a built-in pointer (not shown).

After the reception of data of the contents B is started, the data of the contents A whose reproduction has not been completed is still remained for a while in the buffer 205. The reproduction of the contents A is continued at the client 200 for this while. In this case, the CPU 201 always monitors a data reproducing position (read address) in the buffer 205, and compares this address with the address stored in the built-in pointer indicating the first data of the contents B. When the CPU 201 senses beforehand that the reproduction of the contents B is started by the AV outputting portion 206, based on the monitored and compared results, this CPU 201 controls a setting of a level of de-emphasis in the AV outputting portion 206 and a display of the title in compliance with the contents-attached information of the contents B stored in the built-in register so as to meet the reproduction of the contents B. Then, the reproduction of the contents B is started, the CPU 201 informs the server 100 of the end of reproduction of the contents A and the start of reproduction of the contents B (step S108).

The CPU 101 of the server 100 transmits the last data of the contents B in due course (step S109). Here, when the contents B is the last contents in the group designated by the client, the CPU 101 informs the client 200 that the transmission of the contents B as the last contents has been ended (step S110).

When the reproduction of the contents B as the last contents is ended, the CPU 201 of the client 200 informs the server 100 of the end of reproduction of the contents B (step S111). The CPU 101 of the server 100 ends all processes required for the distribution of the contents in the group designated by the client 200 as soon as it receives this information.

As described above, according to the present embodiment, plural pieces of contents constituting the group can be reproduced continuously on the client 200 side.

Figure 3:
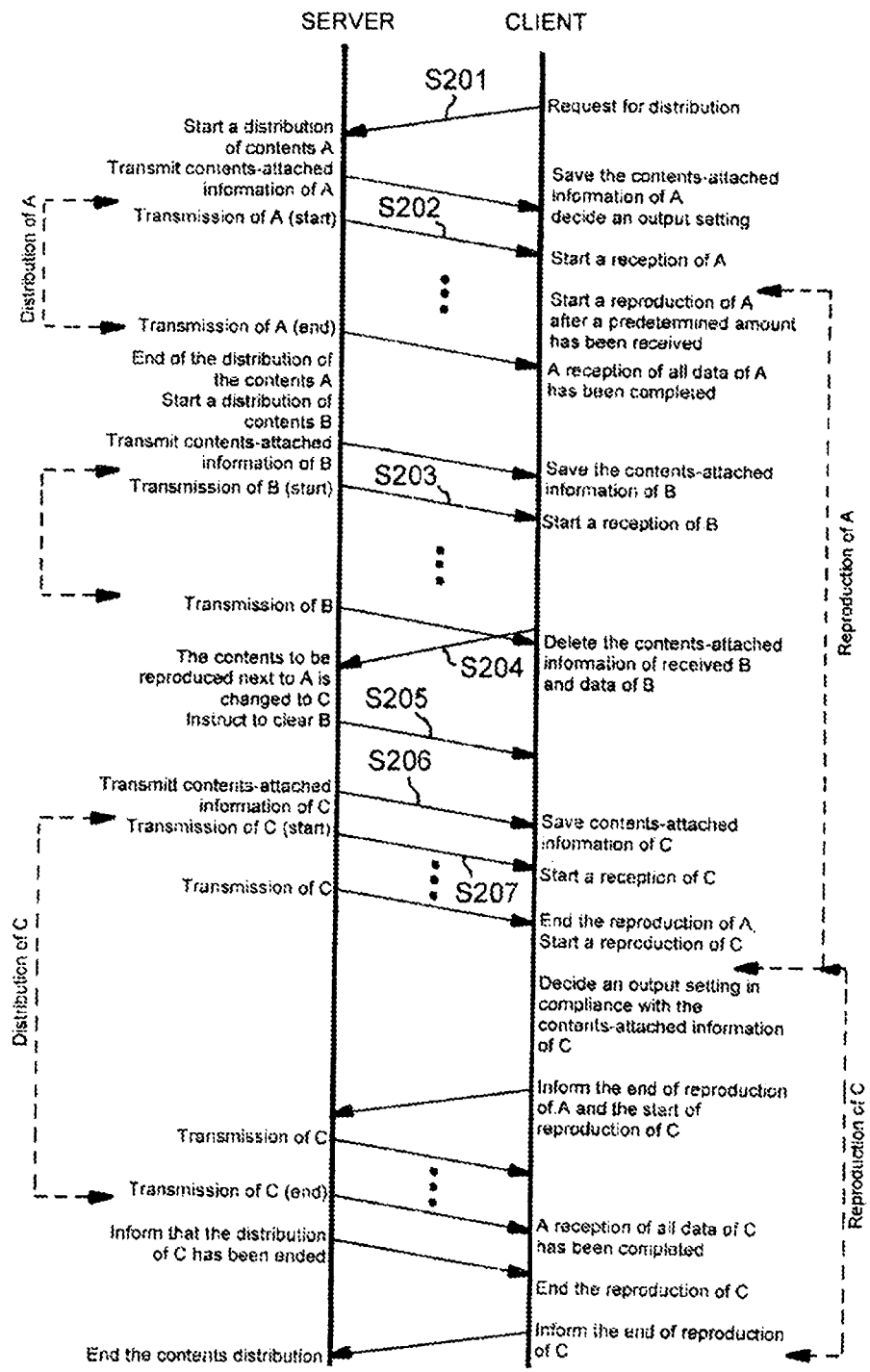
[FIG. 3] A sequence diagram showing another operation in the first embodiment.

FIG. 3 is a sequence diagram showing a second example of an operation of the first embodiment. In this example of the operation, the request for distribution of the group consisting of the contents A, B and C is sent from the client 200 to the server 100 (step S201). Then, the transmission of the contents A is started in response to this request (step S202). Then, the transmission of the contents B is started subsequently (step S203). Then, while the reproduction of the contents A is still continued at the client 200 after the distribution of contents B is started, the request for change to the effect that the contents C should be reproduced next to the contents A in place of the contents B is sent from the client 200 to the server 100 (step S204).

When the server received this request for change, the CPU 101 of the server 100 instructs the client 200 to clear the contents B (step S205). As already explained in the first example of the operation, the CPU 201 of the client 200 stores the contents-attached information of the contents B in the built-in register at a time point when the reception of the contents B is started, and stores the address of the buffer 205, in which the first data of the contents B is stored, in the built-in pointer. When the CPU 201 received the instruction to clear the contents B, the CPU 201 clears the contents-attached information stored in the register and also clears the data of the contents B that are stored in the address of the buffer 205 instructed by the pointer and subsequent addresses.

In contrast, the CPU 101 of the server 100, after sent the instruction to the client 200 to clear the contents B, transmits contents-attached information of the contents C to the client 200 (step S206). Subsequently, the CPU 101 starts the transmission of the contents C to the client 200 (step S207).

When the CPU 201 of the client 200 received the contents-attached information of the contents C, this CPU 201 stores this contents-attached information in the built-in register. Then, when the reception of data of the contents C is started, the CPU 201 loads this data in the buffer 205 to be continued to the last data of the contents A. At that time, the CPU 201 stores the address of the buffer 205, in which the first data of the contents C is stored, in the built-in pointer. Subsequent operations are similar to those in the first example of the operation.

In this manner, since the contents C are accumulated in the buffer 205 to be continued to the contents A, the contents C can be reproduced continuously to the contents A in the client 200.

<Second Embodiment>

In a second embodiment, when plural pieces of the contents are sent from the server to the client in the continuous transmitting mode, stream data on the sound track out of the continuous contents is reproduced in a crossfade mode in the client. In order to execute the crossfade reproduction on only the sound track, in the present embodiment, the buffer for the sound track and the buffer for the video track are provided separately as the buffer 205. Since the data processing of the video track is similar to that in the first embodiment, its explanation will be omitted herein. In the following, only the data processing of the sound track will be explained.

Figure 4:
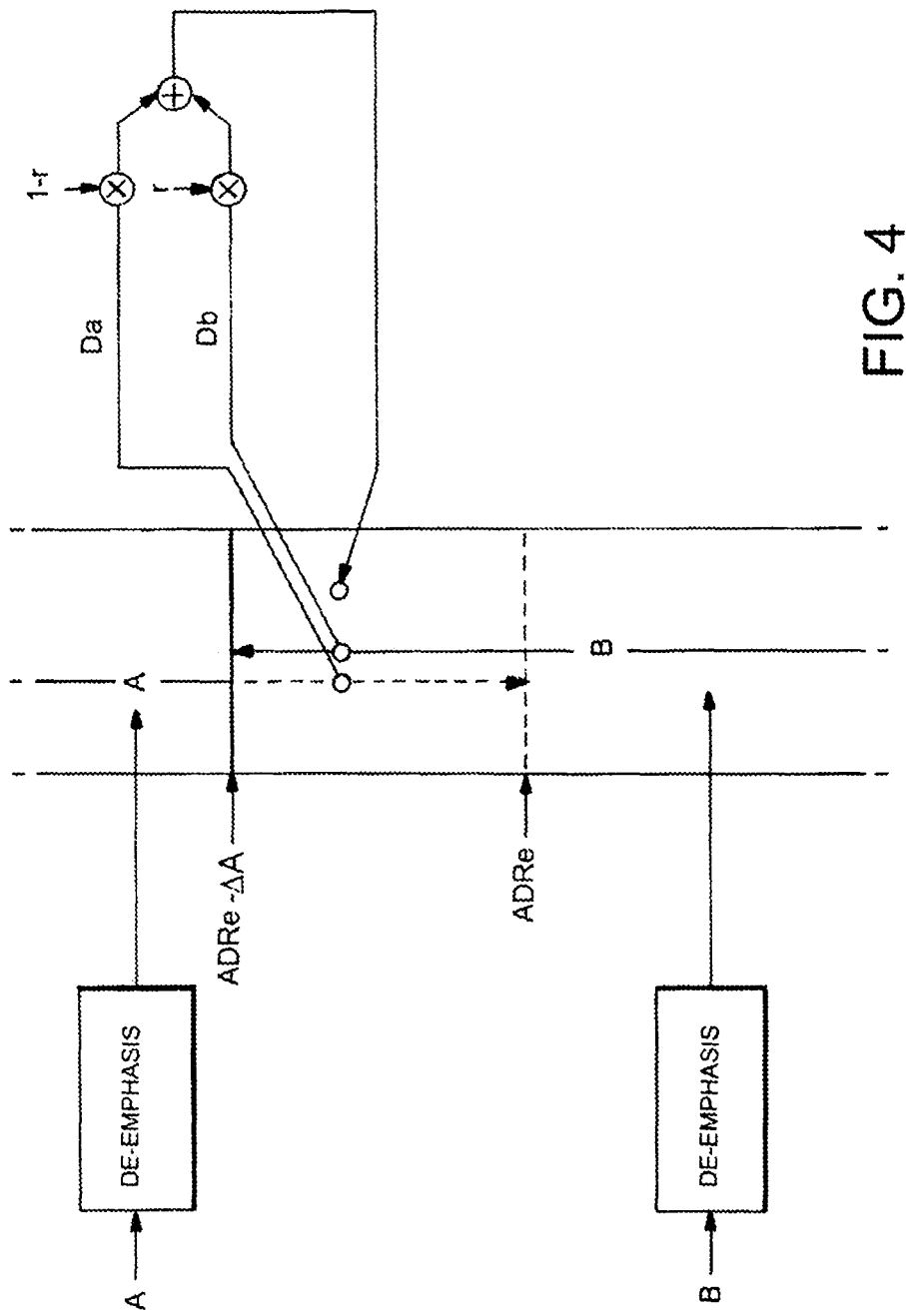
[FIG. 4] A view showing a crossfade reproduction in a second embodiment of the present invention.

FIG. 4 is a view explaining the principle of crossfade reproduction executed in the present embodiment. In the present embodiment, the stream data on the sound track constituting the contents is PCM data, and the pre-emphasis is applied to the data. In the client 200, when the contents are received via the network interface 204, the de-emphasis is applied to the PCM data on the sound track and then resultant data is stored in the buffer. Then, when the reception of the contents B is started after the reception of the contents A and the storage into the buffer are ended, the last data of the contents A stored in the buffer 205 in a predetermined length and the top data of the contents B in a predetermined length are crossfaded mutually, and the data that was subjected to the crossfade is stored in the buffer. In an example shown in FIG. 4, the data of the contents A is loaded in an address ADRe of the buffer. Then, a following calculation is applied to data Db of the contents B received sequentially subsequently and data Da of the contents A already stored in an area from an address ADRe-ΔA to an address ADRe. Then, the calculated result Dx is stored sequentially in an area from the address ADRe-ΔA to the address ADRe.

$$Dx=(1-r)Da+rDb$$

where r is changes continuously from 0 to 1 as the write address of the calculated result Dx proceeds from the address ADRe-ΔA to the address ADRe. In this manner, the last portion of the received contents A in a predetermined length and the top portion of the newly received contents B in a predetermined length are crossfaded, and then the crossfaded data is stored in the buffer 205. After the write address reached the address ADRe, the data of the received contents B is stored as it is in an area later than the address ADRe of the buffer 205 without crossfade.

The AV outputting portion 206 reads sequentially the stream data on the sound track of the contents A and B stored in the buffer in this manner and reproduces the data. At that time, when the process comes near to the last portion in a predetermined length, the crossfaded stream data is read from the buffer and then output as the sound. Therefore, the music that is listened by the user can be shifted naturally from the piece of music of the contents A to the piece of music of the contents B.

When the reproduced music is changed from the contents A to the contents B, the title displayed on the screen must be changed from the title contained in the contents-attached information of the contents A to the title contained in the contents-attached information of the contents B. This change may be executed at a time point when the write address of the data Dx after the crossfade arrives at ADRe-ΔA/2, for example.

<Third Embodiment>

In a third embodiment, like the second embodiment, when plural pieces of contents are sent continuously from the server to the client in the continuous transmitting mode, the stream data of the successive contents on the sound track is reproduced in a crossfade mode at the client.

Figure 5:
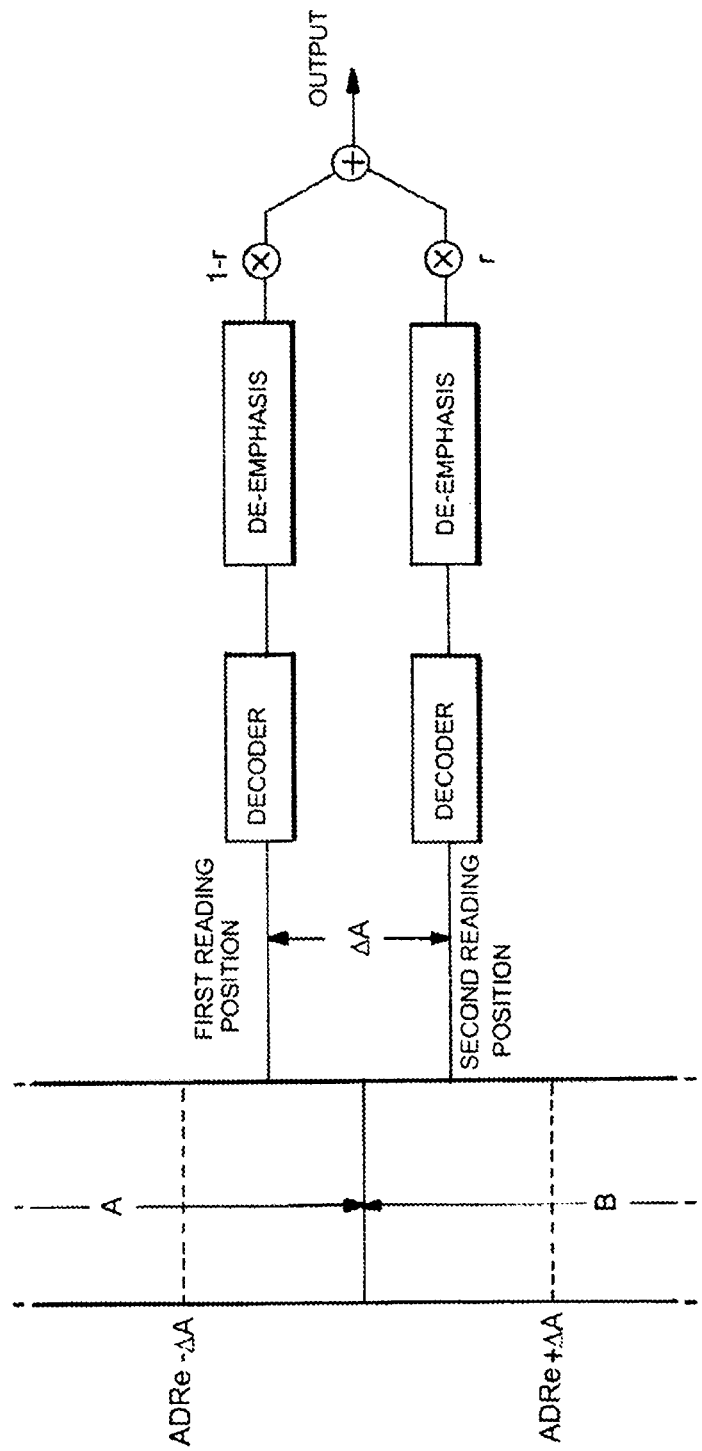
[FIG. 5] A view showing a crossfade reproduction in a third embodiment of the present invention.

FIG. 5 is a view explaining the principle of crossfade reproduction executed in the present embodiment. In the present embodiment, the stream data on the sound track is the coded data obtained by coding the data based on the coding algorithm of MP3 (MPEG 1 layer 3) system, for example. Hence, it is not be advisable that the crossfade should be executed in writing the stream data in the buffer. Therefore, in the present embodiment, the stream data of the contents A is loaded in the buffer, then the stream data of the contents B is loaded in the area subsequent to the last write address ADRe, and then the following crossfade is executed while loading the stream data of the contents B. That is, a first reading position and a second reading position that are separated by a predetermined address length ΔA to put a boundary between a write area of the contents A and a write area of the contents B between them in the buffer are set as reading positions of respective stream data of the contents A and B, then the stream data of the contents A and the stream data of the contents B are read while moving the first reading position and the second reading position ahead sequentially from the address ADRe-ΔA and the address ADRe, then the read data are decoded and de-emphasized, then the calculation in above Eq.(1) is applied to resultant data Da of the contents A and resultant data Db of the contents B, and then resultant data Dx is output from the AV outputting portion 206 as the sound.

In the present embodiment, the similar advantages to those in the second embodiment can be achieved.

The present invention is explained and illustrated with reference to particular preferred embodiments. But it is apparent for those skilled in the art that various variations and modifications can be applied without departing from a spirit, a scope, and an intention of the present invention.

This application is based upon Japanese Patent Application No. 2004-209105 filed on Jul. 15, 2004, the entire contents of which are incorporated herein by reference.

Industrial Applicability

According to the present invention, when the request for distribution of a plurality of contents formed in a group is sent, these contents are sent out continuously from the server to the client. Therefore, these contents can be reproduced continuously on the client side.

The invention claimed is:

1. A contents distributing system, comprising: a server; and a client connected to the server via a network; wherein the client includes:
   a receiving portion that receives plural pieces of audio contents from the server;
   a buffer that is configured to store the plural pieces of audio contents received by the receiving portion sequentially; and
   a reproducing portion that reads the plural pieces of audio contents stored in the buffer sequentially from the early stored audio contents, and then reproduces the plural pieces of audio contents;
wherein the server includes:
a storing portion that is adapted to store the plural pieces of audio contents; and
a transmitting portion that reads the plural pieces of audio contents constituting a group from the storing portion and then transmits the plural pieces of audio contents continuously to the client, when the transmitting portion receives a request for distribution of the plural pieces of audio contents formed in a group from the client;
wherein the plural pieces of audio contents include a first content, a second content, and a third content to be reproduced in this order;
wherein the transmitting portion transmits the first content, the second content, and the third content to the client in this order;
wherein the receiving portion receives the second content from the server while the reproducing portion reproduces the first content;
wherein when the client receives a request for reproducing the third content while the reproducing portion reproduces the first content, the client transmits a reproducing order change request for the third content to the server;
wherein when the server receives the reproducing order change request, the server instructs the client to clear the second content, and transmits the third content to the client;
wherein when the receiving portion receives a clear instruction for the second content, the client clears the second content stored in the buffer; and
wherein the third content is stored in the buffer subsequent to the end of the first component so that the reproducing portion reproduces the third content subsequent to the first content continuously.

2. The contents distributing system according to claim 1, wherein the transmitting portion transmits the plural pieces of audio contents and contents-attached information that the client uses in a reproducing process of the audio contents; and wherein the reproducing portion reproduces the audio contents by using the contents-attached information corresponding to the audio contents read from the buffer.

3. The contents distributing system according to claim 2, wherein the contents-attached information is information regarding a display control of a title of the audio contents.

4. The contents distributing system according to claim 1, wherein the reproducing portion reproduces the plural pieces of audio contents transmitted continuously from the server in a crossfade mode.

5. A client adapted to be connected to a server via a network, the client comprising: a transmitting portion that transmits a request signal for requesting a distribution of a plural pieces of audio contents formed into a group to a server; a receiving portion that receives the plural pieces of audio contents transmitted continuously from the server; a buffer that is adapted to store sequentially the plural pieces of audio contents received by the receiving portion; and
   a reproducing portion that reads the plural pieces of audio contents stored in the buffer sequentially from the early stored audio contents and then reproduces the plural pieces of audio contents;
wherein the plural pieces of audio contents include a first content, a second content, and a third content to be reproduced in this order;
wherein the receiving portion receives the first content, the second content, and the third content in this order from the server;
wherein the receiving portion receives the second content from the server to store the second content into the buffer while the reproducing portion reproduces the first content;

wherein when a request for reproducing the third content is received while the reproducing portion reproduces the first content, the transmitting portion transmits a reproducing order change request for the third content to the server;

wherein the receiving portion receives a clear instruction of the second content, and receives the third component from the server;

wherein when the receiving portion receives the clear instruction, the second content stored in the buffer is cleared; and wherein the third content is stored in the buffer subsequent to the end of the first component so that the reproducing portion reproduces the third content subsequent to the first content continuously.

6. The client according to claim 5, wherein the receiving portion receives the audio contents and contents-attached information that the client uses in a reproducing process of the audio contents; and wherein the reproducing portion reproduces the audio contents by using the contents-attached information corresponding to the audio contents read from the buffer.

7. The client according to claim 6, wherein the contents-attached information is information regarding a display control of a title of the audio contents.

8. The client according to claim 5, wherein the reproducing portion reproduces the plural pieces of audio contents transmitted continuously from the server in a crossfade mode.

9. A server adapted to be connected to a client via a network, the server comprising:
   a storing portion that is adapted to store plural pieces of audio contents;
   a receiving portion that receives a request signal for requesting a distribution of plural pieces of audio contents formed into a group from the client; and
   a transmitting portion that reads the plural pieces of audio contents constituting a group from the storing portion based on the request signal, and transmits continuously the plural pieces of audio contents to the client;
   wherein the plural pieces of audio contents include a first content, a second content, and a third content to be reproduced in this order; wherein the transmitting portion transmits the first content, the second content, and the third content to the client in this order; wherein the transmitting portion transmits the second content while the first content is reproduced; and
   wherein when the receiving portion receives a reproducing order change request for the third content from the client, the transmitting portion transmits a clear instruction to the client so that the second content stored in a buffer of the client is cleared, and transmits the third content to the client so that the third content is reproduced subsequent to the first content continuously.

10. The server according to claim 9, wherein the transmitting portion transmits the audio contents and contents-attached information that the client uses in a reproducing process of the audio contents.

11. The server according to claim 10, wherein the contents-attached information is information regarding a display control of a title of the audio contents.

12. A method of distributing contents from a server to a client via a network, the method comprising: transmitting a request signal for requesting a distribution of plural pieces of audio contents formed into a group from the client to the server; reading the plural pieces of audio contents constituting a group from the storing portion of the server based on the request signal;

transmitting continuously the plural pieces of read audio contents to the client;

receiving the plural pieces of read audio contents transmitted from the server;

storing the plural pieces of received audio contents sequentially in a buffer of the client; and reading the plural pieces of audio contents stored in the buffer sequentially from the early stored audio contents and then reproducing the plural pieces of audio contents;

wherein the plural pieces of audio contents include a first content, a second content, and a third content to be reproduced in this order; wherein in the transmitting process, the first content, the second content, and the third content are transmitted to the client in this order;

wherein the method further comprises:

transmitting a reproducing order change request for the third content to the server while the first content is reproduced;

transmitting a clear instruction and the third content to the client; and deleting the second content stored in the buffer in response to the clear instruction from the server, and wherein the third content is stored in the buffer subsequent to the end of the first component so that the third content is reproduced subsequent to the first content continuously.

13. The method according to claim 12, wherein, in the process of transmitting the plural pieces of audio contents, the audio contents and contents-attached information that the client uses in a reproducing process of the audio contents are transmitted, and wherein, in the reproducing process, the audio contents are reproduced by using the contents-attached information corresponding to the audio contents read from the buffer.

14. The method according to claim 13, wherein the contents-attached information is information regarding a display control of a title of the audio contents.

15. The method according to claim 12, wherein, in the reproducing process, the plural pieces of audio contents transmitted continuously from the server are reproduced in a crossfade mode.

16. A method of reproducing contents at a client adapted to be connected to a server via a network, the method comprising:

transmitting a signal for requesting a distribution of plural pieces of audio contents formed into a group to the server;

receiving the plural pieces of audio contents transmitted continuously from the server;

storing the plural pieces of received audio contents sequentially in a buffer of the client; and reading the plural pieces of audio contents stored in the buffer sequentially from the early stored audio contents and then reproducing the plural pieces of audio contents;

wherein the plural pieces of audio contents include a first content, a second content, and a third content to be reproduced in this order;

wherein in the receiving process, the first content, the second content, and the third content are received from the server in this order;

wherein the method further comprises:

transmitting a reproducing order change request for the third content to the server while the first content is reproduced;

receiving a clear instruction and the third content from the server; and deleting the second content stored in the buffer in response to the clear instruction, and wherein the third content is stored in the buffer subsequent to the end of the first component so that the third content is reproduced subsequent to the first content continuously.

17. The contents reproducing method according to claim 16, wherein, in the receiving process, the audio contents and contents-attached information that the client uses in a reproducing process of the audio contents are received; and wherein, in the reproducing process, the audio contents are reproduced by using the contents-attached information corresponding to the audio contents read from the buffer.

18. The contents reproducing method according to claim 17, wherein the contents-attached information is information regarding a display control of a title of the audio contents.

19. The contents reproducing method according to claim 11, wherein, in the reproducing process, the plural pieces of audio contents transmitted continuously from the server are reproduced in a crossfade mode.

20. A contents distributing system, comprising:
a server; and
a client connected to the server via a network;
wherein the server includes:
    a storing portion that is adapted to store plural pieces of audio or video contents and contents-attached information corresponding to the plural pieces of audio or video contents; and
    a transmitting portion that reads the plural pieces of audio or video contents constituting a group from the storing portion and then transmits the plural pieces of audio or video contents continuously to the client, when the transmitting portion receives a request for distribution of the plural pieces of audio or video contents formed in a group from the client; and
wherein the client includes: a receiving portion that receives the plural pieces of audio or video contents and the contents-attached information from the server; a buffer that is configured to continuously store the plural pieces of audio or video contents received by the receiving portion sequentially;
    a reproducing portion that reads the plural pieces of audio or video contents stored in the buffer sequentially from the early stored audio or video contents, and then reproduces the plural pieces of audio or video contents;
    a monitoring portion that monitors a read address in the buffer from which the plural pieces of audio or video contents are read and compares a beginning address of the plural pieces of audio or video contents stored in the buffer to be reproduced and the read address; and
    a contents-attached information setting portion that conducts a setting of the reproducing portion in accordance with the contents-attached information corresponding to plural pieces of audio or video contents to be reproduced next which is received from the server, when sensing beforehand a reproduction of the plural pieces of audio or video contents stored in the buffer to be reproduced next based on a comparing result of the monitoring portion,
wherein the plural pieces of audio or video contents include a first content, a second content, and a third content to be reproduced in this order;
wherein the transmitting portion transmits the first content, the second content, and the third content to the client in this order;
wherein the receiving portion receives the second content from the server while the reproducing portion reproduces the first content;
wherein when the client receives a request for reproducing the third content while the reproducing portion reproduces the first content, the client transmits a reproducing order change request for the third content to the server;
wherein when the server receives the reproducing order change request, the server instructs the client to clear the second content, and transmits the third content to the client;
wherein when the receiving portion receives a clear instruction for the second content, the client clears the second content stored in the buffer; and
wherein the third content is stored in the buffer subsequent to the end of the first component so that the reproducing portion reproduces the third content subsequent to the first content continuously.

21. The contents distributing system according to claim 20, wherein the contents-attached information is information regarding a display control of a title of the audio or video contents.

22. A client adapted to be connected to a server via a network, the client comprising:
    a transmitting portion that transmits a request signal for requesting a distribution of a plural pieces of audio or video contents formed into a group to a server;
    a receiving portion that receives the plural pieces of audio or video contents and contents-attached information corresponding to the plural pieces of audio or video contents transmitted continuously from the server;
    a buffer that is adapted to continuously store the plural pieces of audio or video contents received by the receiving portion sequentially;
    a reproducing portion that reads the plural pieces of audio or video contents stored in the buffer sequentially from the early stored audio or video contents and then reproduces the plural pieces of audio or video contents;
    a monitoring portion that monitors a read address in the buffer from which the plural pieces of audio or video contents are read and compares a beginning address of the plural pieces of audio or video contents stored in the buffer to be reproduced and the read address; and
    a contents-attached information setting portion that conducts a setting of the reproducing portion in accordance with the contents-attached information corresponding to plural pieces of audio or video contents to be reproduced next which is received from the server, when sensing beforehand a reproduction of the plural pieces of audio or video contents stored in the buffer to be reproduced next based on a comparing result of the monitoring portion,
wherein the plural pieces of audio or video contents include a first content, a second content, and a third content to be reproduced in this order;
wherein the receiving portion receives the first content, the second content, and the third content in this order from the server;
wherein the receiving portion receives the second content from the server to store the second content into the buffer while the reproducing portion reproduces the first content;
wherein when a request for reproducing the third content is received while the reproducing portion reproduces the first content, the transmitting portion transmits a reproducing order change request for the third content to the server;

wherein the receiving portion receives a clear instruction of the second content, and receives the third component from the server;

wherein when the receiving portion receives the clear instruction, the second content stored in the buffer is cleared; and wherein the third content is stored in the buffer subsequent to the end of the first component so that the reproducing portion reproduces the third content subsequent to the first content continuously.

23. The client according to claim 22, wherein the contents-attached information is information regarding a display control of a title of the audio or video contents.

* * * * *